H. COLOMB.
TIMEPIECE.
APPLICATION FILED MAY 13, 1921.
1,438,427.
Patented Dec. 12, 1922.
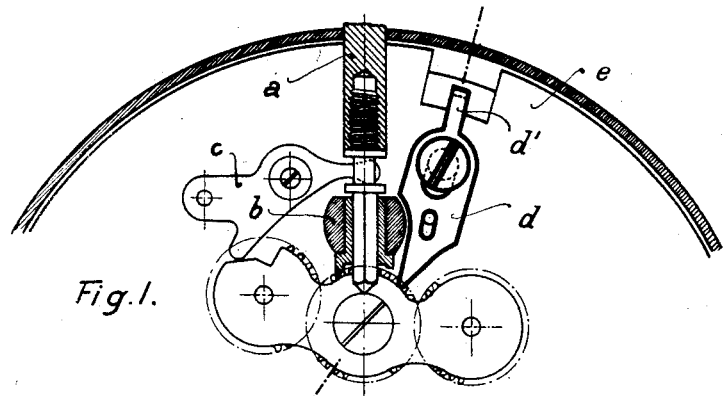
Fig.1.
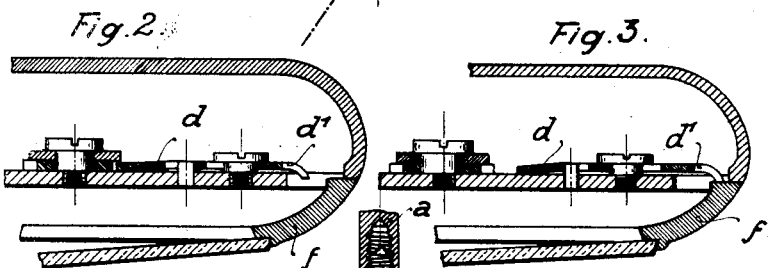
Fig.2. Fig.3.
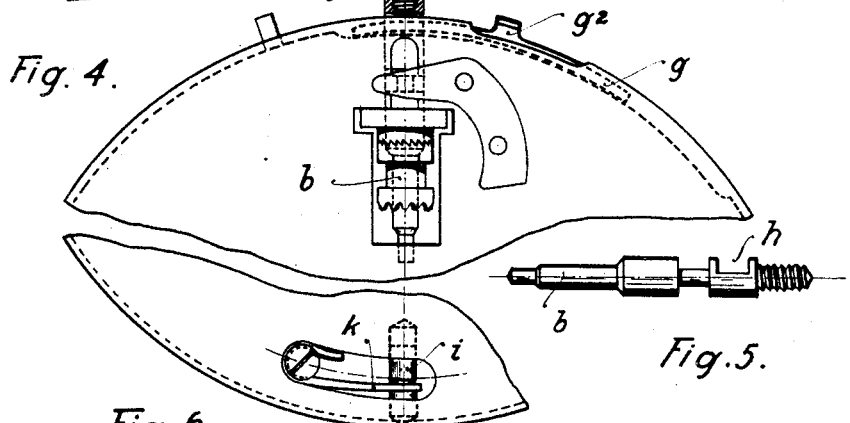
Fig.4.
Fig.5.
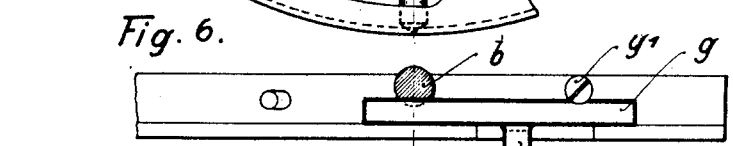
Fig.6.
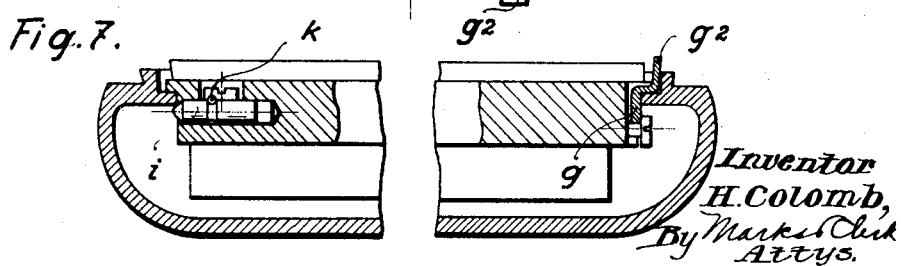
Fig.7.
Inventor
H. Colomb,
By Marks Clerk
Attys.

Patented Dec. 12, 1922.

1,438,427

UNITED STATES PATENT OFFICE.

HENRI COLOMB, OF TAVANNES, SWITZERLAND.

TIMEPIECE.

Application filed May 13, 1921. Serial No. 469,311.

*To all whom it may concern:*

Be it known that I, HENRI COLOMB, citizen of the Republic of Switzerland, residing at Tavannes, Switzerland, have invented a new and useful Improvement in Timepieces; and I do hereby declare the following to be a full, clear, and exact description of the same.

The present invention relates to a timepiece provided with a stem of two pieces, both parts of said stem being coupled and uncoupled by a relative rotative movement, one of said parts being, for this purpose, locked.

In the remontoire-mechanisms and hand setting known as "positive", the stem on which the crown is fitted is of one piece and is directly coupled to a lever known as a "draw-piece" or "bolt" which is set in action by means of the crown.

The draw-piece is kept in contact with the stem by means of a collet-screw adjusted between the bridge and the plate.

In order to fasten or to take off the stem when the movement is cased or taken out, it is necessary to act on the above-mentioned screw and this may be done from the movement side.

It is therefore comprehensible that movements provided with such remontoire-mechanisms with draw-piece cannot be used with cap-cases.

Some constructions have already been proposed in order to obviate said disadvantage but in all constructions, the coupling and unlocking of the stem and of the draw-piece is done by means of a special mechanism acting upon said draw-piece, either vertically, or parallel with regard to the movement.

In order to be used with a cap-case, the movement of a time-piece according to the present invention wants no modifications, even if it is provided with other constructions already proposed and above mentioned.

This result is obtained by means of a stem of two pieces which are rigidly coupled one with the other, preferably by screwing or by means of a bayonet-joint.

Both sorts of coupling could be done only when the winding-up is finished but the spring and eventually the stop-work suffer thereby; the uncoupling could however not take place. The time-piece according to the invention has therefore been provided with means for locking the part of the stem connected with the movement, this in order to obtain the coupling and especially the uncoupling of the outer part of the stem going through the pendant with the part connected with the movement.

In certain cases, the outer part of the stem may be omitted; i. e., in the bracelet-watches the crown will be screwed on the inner part of the stem.

The movement of a watch according to the present invention may be cased in cap-cases, even if it is provided with a push hand-setting or if the stem is coupled with the movement by means of a bridle, the screw of which is accessible only from the movement side.

Two time-pieces provided with a stem according to the invention are represented in the annexed drawings, as explicative but not restrictive examples.

Figs. 1, 2 and 3 of the drawings relate to a movement with rocking-remontoire and a draw-piece hand-setting, while Figs. 4, 5, 6 and 7 relate to a movement with remontoire-mechanism and draw-piece hand-setting, as commonly used.

In the first form of execution, the stem is of two pieces $a$ and $b$; the latter is connected with the movement in which it is held by the draw-piece $c$. Part $a$ fits on part $b$ by screwing and in order that said screwing may be effected, as well as the unscrewing, a push-piece $d$ is provided, which presents openings and which is guided by a pin and a shoulder-screw on the surface of the plate $e$. The lower extremity $d^1$ of said push-piece is placed in such a manner as, when it is in the position represented on Figs. 1 and 2, to catch in the cog-wheel of the winding-up ratchet. The part of the stem connected with the movement is thus locked and the coupling with the outer part $a$ of said stem may be effected with all firmness required.

The draw-piece $d$ is slightly curved and springs against the head of the shoulder-screw, keeping said draw-piece on the plate; the bent extremity $d^1$ of the draw-piece moves in a notch of the case and is placed under the rim $f$ when the push-piece is disengaged from the cog-wheel of the winding-up ratchet. When the rim is placed on the cap, it therefore presses on the extremity $d^1$ of the draw-piece and thus contributes to the holding of the movement in the case.

The form of execution represented in Figs.

4 and 7 is not the same. Parts $a$ and $b$ of the stem are always coupled by screwing, but the locking of the inner part connected with the movement is directly effected by means of the extremity of a slide-bar $g$ which catches in a notch $h$ of the stem. Part $b$ of the latter is more specially represented in Fig. 5. Said slide-bar is forced between the bottom of said notch and the edge of the groove of the plate, in order to lock the part $b$.

The slide-bar is provided with a driving clutch $g^2$ bent perpendicularly to the plane of the plate and a certain length of which projects from the latter; said slide-bar is curved so as to cause it to rub against the periphery of the plate, by means of a screw $g^1$.

It is to be considered here that the case in which the movement is placed wants neither groove nor notch for the casing, this being an advantage for the manufacturing.

This casing is effected by introducing, at the same time, the catch placed near the stem under the shutting rim of the case and the upper extremity of part $b$ of the stem in the pendant of the opening of the case provided for the same and by pressing on the movement on the side opposite to said parts till the shutting has passed under the case-band edge against which the plate leans.

The shutting is provided with a bolt $i$ kept in place by a spring $k$ embedded in a groove of the plate and engaging in a hollow of the bolt.

Instead of being coupled by screwing, the parts of the stem could also be coupled one to the other by means of a bayonet-joint.

I claim:

1. A time-piece including a winding stem formed of an inner section and an outer section, means for coupling and uncoupling said sections by relative rotative movement of the same, a pinion moved by said stem, and means engageable with said pinion for locking said pinion against movement in order to permit the outer section to be coupled to or uncoupled from the inner section.

2. A time-piece including a stem formed of an inner section and an outer section, threaded means connecting said sections in order to permit the same to be connected or disconnected by a relative rotative movement of the sections, a pinion moved by said stem, and means engageable with said pinion for locking said pinion against movement in order to permit the outer section to be coupled to or uncoupled from the inner section.

3. In a time piece, a winding pinion, a stem for actuating said pinion formed of an inner section and an outer section, means for coupling and uncoupling by a relative rotative movement of the same, and a slidable detent engageable with said pinion for locking the same against movement in order to permit the outer section to be connected to or disconnected from the inner section.

In testimony whereof, I have signed my name to this specification in the presence of two subscribing witnesses.

HENRI COLOMB.

Witnesses:
 EDGAR FAVRE,
 CHARLES TEAUNE.